Feb. 21, 1967 W. T. J. FOSTER 3,305,222
APPARATUS FOR PREPARING BATCHES OF CONCRETE
Filed June 11, 1965

William T. J. Foster
INVENTOR
BY
Oliver D. Olson
Agent

United States Patent Office 3,305,222
Patented Feb. 21, 1967

3,305,222
APPARATUS FOR PREPARING BATCHES
OF CONCRETE
William T. J. Foster, 1225 20th SE.,
Salem, Oreg. 97301
Filed June 11, 1965, Ser. No. 463,226
9 Claims. (Cl. 259—165)

This invention relates to the making of concrete, and more particularly to apparatus for preparing small batches of concrete.

It is a frequent occurrence, particularly around the home, that there is a need for a small quantity of concrete. Since the delivery of such small quantities of premixed concrete is either unavailable or is extremely costly, it is generally required that the home owner purchase small packages of dry premix and then mix it with water either by hand or by means of the rental of a portable mixer. This procedure also is relatively expensive, and in addition is quite inconvenient and is subject to error in the preparation of the wet mixture.

Accordingly, it is the principal object of the present invention to provide apparatus for the preparation of fractional yard batches of properly proportioned concrete.

Another important object of this invention is the provision of apparatus of the class described for preparing a fractional yard of concrete automatically upon the deposit of a prescribed amount of coin in a coin-operated control unit associated with the apparatus.

Still another important object of the present invention is the provision of apparatus of the class described in which a single conveyor unit performs the dual function of preliminarily conveying the separate ingredients of concrete to their respective storage hoppers and also of conveying such ingredients from the hoppers to a mixing chamber.

A further important object of the present invention is the provision of apparatus of the class described which is a unitary structure of simplified construction for economical manufacture.

Figure 1:
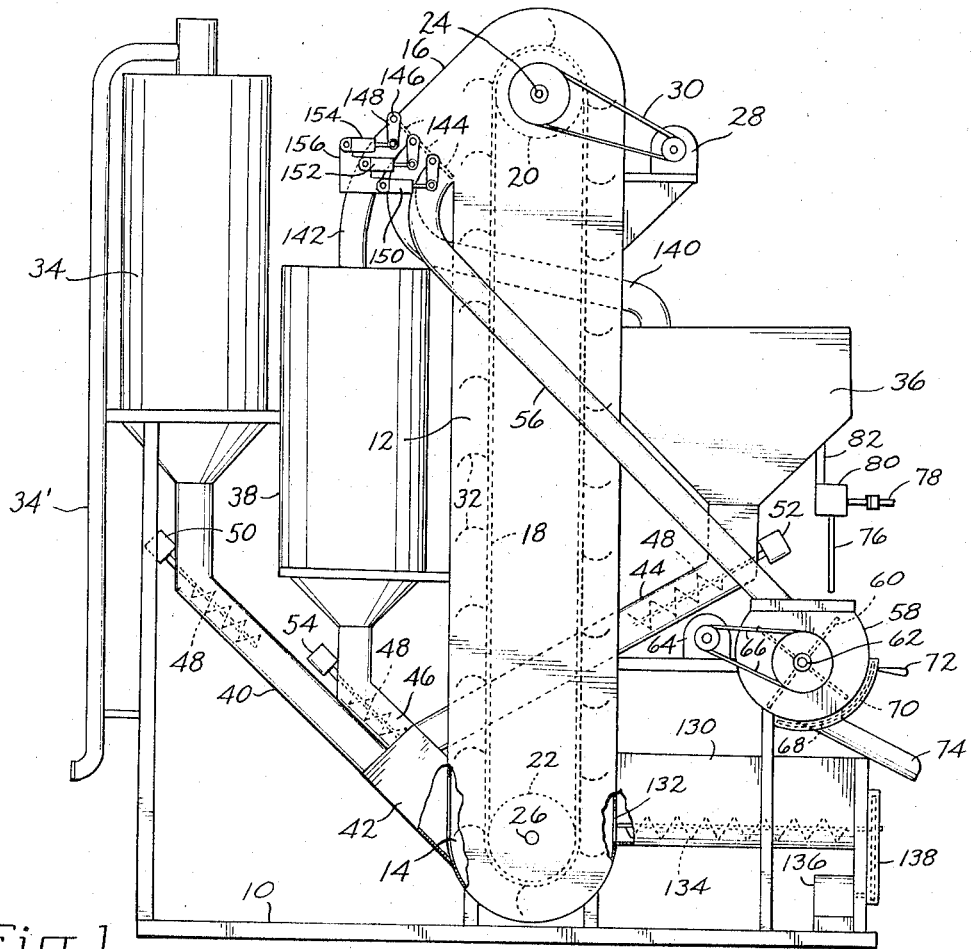
Figure 2:
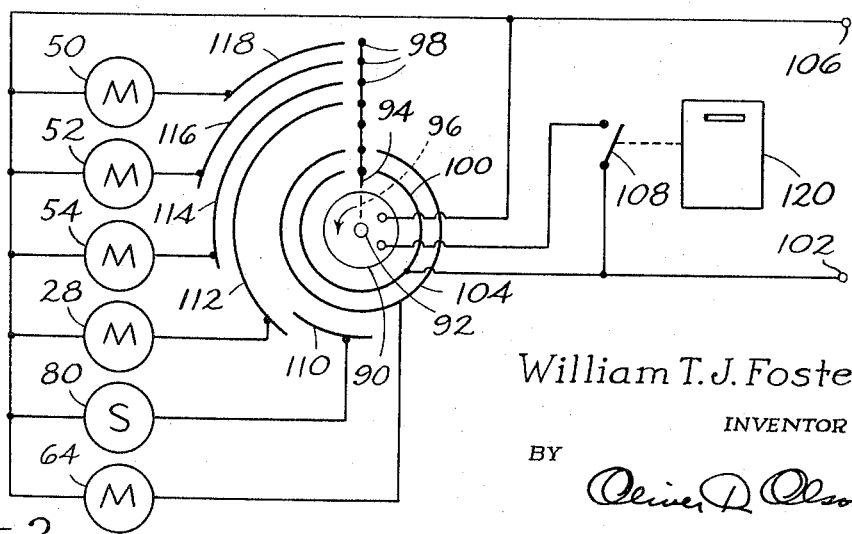

The foregoing and other objects and advantages of this invention will appear from the following detailed description, taken in connection with the accompanying drawing in which:

FIG. 1 is a view in side elevation of apparatus embodying the features of the present invention; and FIG. 2 is a schematic electrical diagram illustrating one manner in which the apparatus of FIG. 1 may be operated automatically to prepare a predetermined quantity of concrete.

The apparatus illustrated in FIG. 1 includes a base 10 which supports an upstanding elongated housing 12 the lower end of which defines a receiving chamber 14 and the upper end of which defines a discharge head 16. An endless conveyor belt 18 or chain is supported within the housing, through substantially the entire length thereof, by means of the spaced pulleys 20 and 22 mounted for rotation on the shafts 24 and 26, respectively, supported by the housing. One of the shafts, for example the upper shaft 24, is driven by the electric motor 28 the output shaft of which is connected to the driven shaft 24 by means of the drive chain 30.

The conveyor belt supports a plurality of bucket members 32 which are so arranged that, upon counterclockwise rotation of the pulleys, each bucket passes through the receiving chamber 14 where it is filled with the material deposited therein, and then is elevated to the upper end of the housing where the contents of the bucket are ejected by centrifugal force into the discharge head 16.

Also supported on the base, by suitable framework only partially illustrated, is a storage hopper 34 for cement, a storage hopper 36 for sand and a storage hopper 38 for gravel. The lower ends of these hoppers are provided with discharge means which communicate them with the receiving chamber 14.

Thus, in the embodiment illustrated, the lower end of the cement hopper is connected to one end of the hollow conduit 40 the other end of which communicates with the receiving funnel 42 which, in turn, communicates with the receiving chamber. In similar manner, the lower ends of the sand and gravel hoppers are connected to one end of the hollow conduits 44 and 46, respectively, the other ends of which communicate with the receiving funnel.

Control means also is provided for regulating the amount of material discharged from each of the hoppers to the receiving chamber 14 so as to provide proper proportions of ingredients for the desired concrete formula. In the embodiment illustrated, such means are provided by the screw feeders 48 mounted within the conduits and each individually driven by a separate electric motor 50, 52 and 54. The motors preferably are of the variable speed type to provide for varying the amount of material fed from the hopper per unit of time, although it will be understood that constant speed motors may be employed if desired.

Outfeed means is provided for delivering the materials deposited in the receiving chamber from the hoppers to a mixing chamber. In the embodiment illustrated, this means is provided by the hollow outfeed conduit 56 which communicates at one end with the discharge head of the conveyor housing and at the opposite end with the interior of the mixing vessel 58 which defines the mixing chamber.

A plurality of paddles 60 are supported within the mixing chamber for rotation with the shaft 62 which is driven by the electric motor 64 through the interconnecting belt 66.

An opening 68 adjacent the bottom of the mixing vessel is removably closed by the slidable gate 70, operable manually by the handle 72. Thus, after appropriate mixing of the ingredients in the mixing chamber, the contents may be withdrawn by pulling upwardly on the gate and allowing the contents to discharge through the opening and down the chute 74 into a container (not shown) positioned under the latter.

Although it may be desirable in some instances to dispense the dry mixture from the mixing chamber, as discussed above, means also is provided for admitting water into the mixing chamber to prepare a proper wet mixture of concrete. In the embodiment illustrated, such feed means is provided by the water pipe 76 positioned with its discharge opening above the mixing chamber and its inlet end arranged for connection to a source 78 of water. Intermediate the ends of the water pipe is an electrically controlled solenoid valve 80 by which to control the amount of water fed to the mixing chamber. The water feed assembly is supported in proper position by any conventional means, such as the bracket 82 secured to the sand hopper.

The drive motors and water control solenoid may be controlled individually by manual means, as will be apparent. However, in the preferred embodiment of the present invention, electrical means is provided for actuating the electrical drive components automatically for predetermined periods of time calculated to deliver to the mixing chamber the required proportions of the various ingredients for a desired concrete formula. One such electrical means is illustrated schematically in FIG. 2.

An electric timer motor 90 supports on its rotary output shaft 92 for rotation therewith an electrically conductive contact arm 94 which is insulated electrically from the motor shaft, as indicated by the dash line 96. The arm carries a plurality of spaced contacts 98 each arranged for sliding engagement with a fixed contact of predetermined arcuate length. Thus, the innermost arm contact is arranged for engagement with the split collector ring 100 which is connected electrically to the terminal 102 of a source of electric potential.

The next outer arm contact is arranged for engagement with the split ring 104. One terminal of the mixer motor 64 is connected to this ring and the other terminal of the motor is connected to the other terminal 106 of the electric supply. This ring also is connected to one terminal of the timer motor 90 and also to the supply terminal 102 through the electric start switch 108. The other terminal of the timer motor is connected to the supply terminal 106.

The next outer arm contact is arranged for sliding engagement with the fixed conductor segment 110 which is connected through the water feed control solenoid 80 to the supply terminal 106. The next outer arm contact is arranged for sliding engagement with the fixed conductor segment 112 which is connected through the conveyor motor 28 to the supply terminal 106. The next outer arm contact is arranged for engagement with the conductor segment 114 which is connected through the gravel feed motor 54 to the supply terminal 106. The next outer arm contact is arranged for sliding engagement with the conductor segment 116 which is connected through the sand feed motor 52 to the supply terminal 106. Finally, the outermost arm contact is arranged for sliding engagement with the conductor segment 118 which is connected through the cement feed motor 50 to the supply terminal 106.

The start switch 108 may be operated manually. However, in the preferred embodiment illustrated it is operated by a conventional coin-operated control unit 120, many types of which are well known and commercially available. By the deposit of a requisite coin or number of coins in the control unit the start switch is closed momentarily, to complete the electric circuit of the timer motor 90. Thereupon the contact arm 94 commences rotation, bringing one of its contacts into electrical engagement with the fixed collector ring 100. The electric circuit of the timer motor thus is completed through the electrically interconnected arm contacts 98 and associated fixed segment contacts 100 and 102, bypassing the start switch 108. It will be apparent, therefore, that the cycle of automatic operation is completed by one revolution of the timer motor, the latter being deenergized when the arm contacts disengage from the fixed segment contacts and enter the electrically non-conductive space between the ends of the split segment contacts.

During the cycle of operation of the timer motor the electric circuits of the various motors and water control solenoid are completed, each for a predetermined period of time calculated to provide the proper proportions of ingredients for the desired concrete formula. Thus, the desired proportions of cement, sand and gravel are dispensed to the receiving chamber, in sequence, or simultaneously as illustrated, and immediately conveyed by operation of the conveyor motor, to the mixing chamber where the mixing motor also is in operation. After delivery of the foregoing ingredients to the mixing chamber, the electric circuit of the water feed solenoid is completed, thereby activating the solenoid to open the feed line for a predetermined time calculated to deliver the required amount of water to the mixing chamber. Thereafter, the mixer motor continues to operate for a time calculated to insure complete mixing of the ingredients. The timer motor then continues on to complete its cycle.

The supply hoppers may be filled by various means. For example, it is conventional to fill the cement hopper 34 by blowing the dry cement through the infeed conduit 34' by means of a conventional centrifugal pump (not shown). The sand and gravel hoppers may be filled by means of conveyor belts, bucket cranes, dump buckets, etc. However, in the preferred embodiment illustrated in FIG. 1, means is provided for filling the sand and gravel hoppers by utilizing the elevating conveyor. Accordingly, an infeed chamber 130 is positioned for communication at one end with the receiving chamber 14 through the opening 132. Mounted within the infeed chamber is an elongated feed screw 134 which is driven by the electric motor 136 through the interconnecting gear reduction unit 138. Thus, sand or gravel may be deposited in the infeed chamber, for example from a dump truck, and conveyed by the feed screw 134 through the opening 132 and into the receiving chamber 14 from whence it is elevated in the buckets 32 to the dispensing head 16.

The outlet of the dispensing head communicates not only with the outfeed conduit 56 previously described, but also with one end of the delivery conduits 140 and 142, the opposite ends of which communicate with the upper ends of the sand and gravel hoppers 36 and 38, respectively.

Accordingly, means is provided for removably closing the ends of these conduits adjacent the discharge head, so that the contents of the conveyor buckets may be directed to the appropriate hopper or mixing chamber.

In the embodiment illustrated, a valve member 144 of the butterfly type is associated with the upper end of each conduit and is secured to a shaft 146 mounted for pivotal movement adjacent the outlet of the discharge head. A lever arm 148 is secured at one end to each of the shafts, and the opposite ends of the lever arms are connected pivotally to the projecting ends of the armatures of the electrical solenoids 150, 152 and 154 which are mounted pivotally on a supported bracket 156. In the deenergized condition of each solenoid its arm is an extended position and the valve member 144 extends across the open upper end of the associated conduit, closing the latter against delivery of material to it from the discharge head 16.

Upon activation of one of the solenoids, its armature is retracted and the associated valve member 144 is rotated clockwise, opening the upper end of the associated conduit to receive the contents discharged from the buckets 32 into the head 16. Thus, for illustration, when sand is deposited in the infeed chamber 130 for delivery to the sand hopper 36, the corresponding solenoid 152 is activated, by closing a switch in its electric circuit, while the other solenoids 150 and 154 are maintained deactivated.

It will be understood that when the apparatus is set for automatic operation for the preparation of a batch of concrete, the solenoids 152 and 154 associated with the sand and gravel delivery conduits will be maintained deactivated and the solenoid 150 associated with the outfeed conduit 56 to the mixing chamber 58 will be activated, to open the associated valve member 144.

It will be apparent to those skilled in the art that various changes may be made in the size, shape and arrangement of parts described hereinbefore without departing from the spirit of this invention and the scope of the appended claims.

Having now described my invention and the manner in which it may be used, what I claim as new and desire to secure by Letters Patent is:

1. Apparatus for preparing batches of concrete, comprising
   (a) a receiving chamber,
   (b) a cement hopper,
   (c) a sand hopper,
   (d) a gravel hopper,
   (e) discharge means communicating each of the said hoppers with the receiving chamber,
   (f) control means associated with each discharge means for regulating the amount of material discharged from the associated hopper to the receiving chamber,
   (g) elevating conveyor means communicating at its lower end with the receiving chamber,
   (h) a mixing chamber including a mixing means therein, (i) outfeed means communicating the upper end of the conveyor means with the mixing chamber,
(j) means communicating with the receiving chamber for feeding sand and gravel selectively thereto, and
(k) delivery means communicating the upper end of the conveyor means selectively with the sand and gravel hoppers for delivering sand and gravel to said respective hoppers from the receiving chambers by said elevating conveyor means.

2. The apparatus of claim 1 including water feed means adjacent the mixing chamber for introducing water to said chamber.

3. The apparatus of claim 1 including
 (a) drive means for each of the conveyor means, discharge control means and mixing means,
 (b) electrical actuator means for each drive means and each having an electric circuit, and
 (c) timer controlled switch means in each electric circuit and operable to control the length of time of activation of the associated actuator means.

4. The apparatus of claim 3 including
 (a) water feed means adjacent the mixing chamber for introducing water to said chamber,
 (b) control means for the water feed means,
 (c) electrical actuator means for the control means and having an electric circuit, and
 (d) timer controlled switch means in said electric circuit and operable to control the length of time of activation of the associated actuator means.

5. Apparatus for preparing batches of concrete, comprising
 (a) a receiving chamber,
 (b) a cement hopper,
 (c) a sand hopper,
 (d) a gravel hopper,
 (e) discharge means communicating each of the said hoppers with the receiving chamber,
 (f) control means associated with each discharge means for regulating the amount of material discharged from the associated hopper to the receiving chamber,
 (g) elevating conveyor means communicating at its lower end with the receiving chamber,
 (h) a mixing chamber including mixing means therein,
 (i) outfeed means communicating the upper end of the conveyor means with the mixing chamber,
 (j) infeed chamber means communicating with the receiving chamber for feeding sand and gravel selectively to the receiving chamber,
 (k) sand delivery means communicating the upper end of the conveyor means with the sand hopper,
 (l) gravel delivery means communicating the upper end of the conveyor means with the gravel hopper, and
 (m) valve means associated with each delivery means and said outfeed means and operable selectively to removably close said delivery and outfeed means against delivery of material therethrough.

6. Apparatus for preparing batches of concrete, comprising
 (a) a receiving chamber,
 (b) a cement hopper,
 (c) a sand hopper,
 (d) a gravel hopper,
 (e) discharge means communicating each of the said hoppers with the receiving chamber,
 (f) control means associated with each discharge means for regulating the amount of material discharged from the associated hopper to the receiving chamber,
 (g) elevating conveyor means communicating at its lower end with the receiving chamber,
 (h) a mixing chamber including mixing means therein,
 (i) outfeed means communicating the upper end of the conveyor means with the mixing chamber,
 (j) drive means for each of the conveyor means, discharge control means and mixing means,
 (k) electrical actuator means for each drive means and each having an electric circuit,
 (l) timer controlled switch means in each electric circuit and operable to control the length of time of activation of the associated actuator means,
 (m) infeed chamber means communicating with the receiving chamber for feeding sand and gravel selectively to the receiving chamber,
 (n) sand delivery means communicating the upper end of the conveyor means with the sand hopper,
 (o) gravel delivery means communicating the upper end of the conveyor means with the gravel hopper, and
 (p) valve means associated with each delivery means and said outfeed means and operable selectively to removably close said delivery and outfeed means against delivery of material therethrough.

7. The apparatus of claim 6 including
 (a) water feed means adjacent the mixing chamber for introducing water to said chamber,
 (b) control means for the water feed means,
 (c) electrical actuator means for the control means and having an electric circuit, and
 (d) timer controlled switch means in said electric circuit and operable to control the length of time of activation of the associated actuator means.

8. Apparatus for preparing batches of concrete, comprising
 (a) a receiving chamber,
 (b) a cement hopper,
 (c) a sand hopper,
 (d) a gravel hopper,
 (e) discharge means communicating each of the said hoppers with the receiving chamber,
 (f) control means asosciated with each discharge means for regulating the amount of material discharged from the associated hopper to the receiving chamber,
 (g) elevating conveyor means communicating at its lower end with the receiving chamber,
 (h) a mixing chamber including mixing means therein,
 (i) outfeed means communicating the upper end of the conveyor means with the mixing chamber,
 (j) drive means for each of the conveyor means, discharge control means and mixing means,
 (k) electrical actuator means for each drive means and each having an electric circuit, and
 (l) timer controlled switch means in each electric circuit and operable to control the length of time of activation of the associated actuator means.

9. The apparatus of claim 8 including
 (a) water feed means adjacent the mixing chamber for introducing water to said chamber,
 (b) control means for the water feed means,
 (c) electrical actuator means for the control means and having an electric circuit, and
 (d) timer controlled switch means in said electric circuit and operable to control the length of time of activation of the associated actuator means.

References Cited by the Examiner
UNITED STATES PATENTS

| | | | |
|---|---|---|---|
| 750,949 | 2/1904 | Wood | 259—154 |
| 1,611,297 | 12/1926 | Wickey | 259—165 |
| 2,285,765 | 6/1942 | Carswell | 259—165 |
| 2,800,312 | 7/1957 | Ruby | 259—154 |
| 2,976,025 | 3/1961 | Pro | 259—178 |
| 3,139,271 | 6/1964 | Clavssen | 259—154 |

WALTER A. SCHEEL, *Primary Examiner.*

R. W. JENKINS, *Assistant Examiner.*